No. 801,704. PATENTED OCT. 10, 1905.
V. D. ANDERSON.
PRESS FOR EXTRACTING OIL FROM SEEDS AND THE LIKE.
APPLICATION FILED JUNE 23, 1905.
6 SHEETS—SHEET 3.

No. 801,704. PATENTED OCT. 10, 1905.
V. D. ANDERSON.
PRESS FOR EXTRACTING OIL FROM SEEDS AND THE LIKE.
APPLICATION FILED JUNE 23, 1905.

UNITED STATES PATENT OFFICE.

VALERIUS D. ANDERSON, OF CLEVELAND, OHIO.

PRESS FOR EXTRACTING OIL FROM SEEDS AND THE LIKE.

No. 801,704.   Specification of Letters Patent.   Patented Oct. 10, 1905.

Application filed June 23, 1905. Serial No. 266,630.

*To all whom it may concern:*

Be it known that I, VALERIUS D. ANDERSON, a citizen of the United States, residing at Cleveland, in the county of Cuyahoga and State of Ohio, have invented certain new and useful Improvements in Presses for Extracting Oil from Seeds and the Like, of which the following is a specification.

My present invention pertains to improvements in presses for extracting oil from seed and the like, the construction and advantages of which will be hereinafter set forth, reference being had to the annexed drawings, wherein—

Fig. 16, a similar view of the plate used in conjunction with the frame or member just referred to; Fig. 18, a longitudinal sectional view of the settling-trough; Fig. 19, a vertical sectional view taken on the line 19 19 of Fig. 18, and Fig. 20 a horizontal sectional view taken on the line 20 20 of Fig. 18.

The main object of the invention is to provide a press in which a complete separation of the oil from the seeds and the foots which pass out with the oil may be effected.

A further object is to provide a machine in which the operation of pressing is a continuous one.

The apparatus employed may be said to consist of a press which will act continuously to extract or expel the oil from the seeds or other material under treatment and a strainer designed to receive the oil from the press and to effect a separation of the foots from the oil and to pass the foots to a conveyer which delivers them to the delivery spout or hopper of the press. The oil which passes from the strainer may be pumped to a settling-tank, where a further separation of the foots from the oil is effected, the foots being fed into the hopper of the press together with the foots which are removed from the strainer.

In order to effect a complete separation of the foots from the oil, it has been found preferable to heat the oil in the settling-tank. The foots which are separated from the oil in the tank are moved gradually from one end to the other in a direction reverse to that of the feed of the oil through the tank, the motion of the foots being comparatively slow, so that a substantially complete separation is effected.

The foots are discharged from the settling-tank at a point above the level of the oil in said tank, and they consequently leave the tank in a relatively dry condition, though of course containing a considerable percentage of oil.

It is to be understood that the settling-tank may be omitted and the separation of the foots from the oil effected solely by the strainer hereinbefore referred to.

The press may be of any approved type, that shown herein and designated by the reference-letter A forming the basis of Letters Patent of the United States No. 647,354, dated April 10, 1900; No. 731,734, dated June 23, 1903; No. 731,735, dated June 23, 1903, and No. 731,737, dated June 23, 1903.

Figures 2, 3:
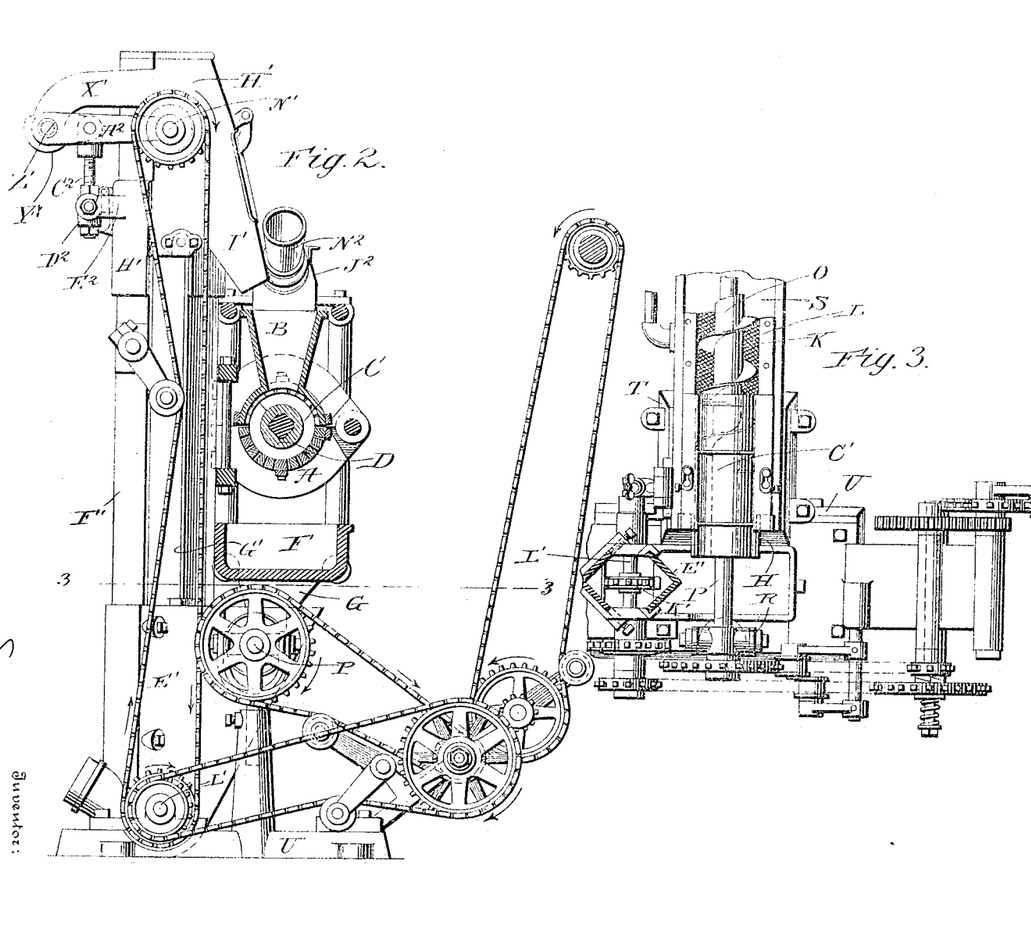
Fig. 2, a vertical sectional view on the line 2 2 of Fig. 1.
Fig. 3, a horizontal sectional view on the line 3 3 of Fig. 2.

The press is provided with a hopper B, designed to receive the whole or disrupted seeds or other material from which the oil is to be expressed, the seeds being passed through the press by the action of the separated screws C, one of which is shown in Fig. 2, the screws being carried by a shaft D.

Figure 9:
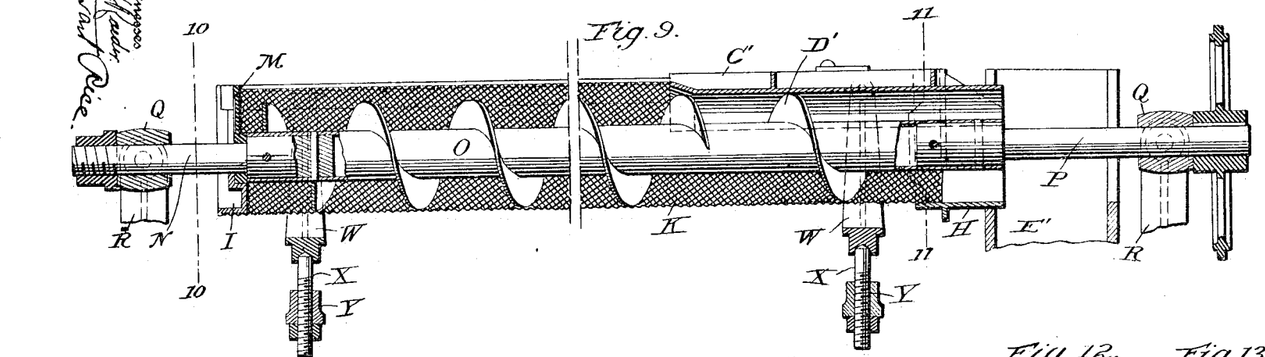
Fig. 9, a longitudinal sectional view of the strainer.
Figure 10:
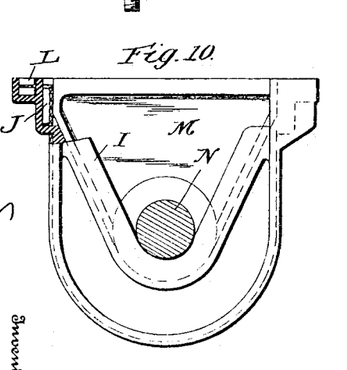
Fig. 10, a vertical sectional view taken on the line 10 10 of Fig. 9, portions being broken away.
Figures 11, 12, 13:
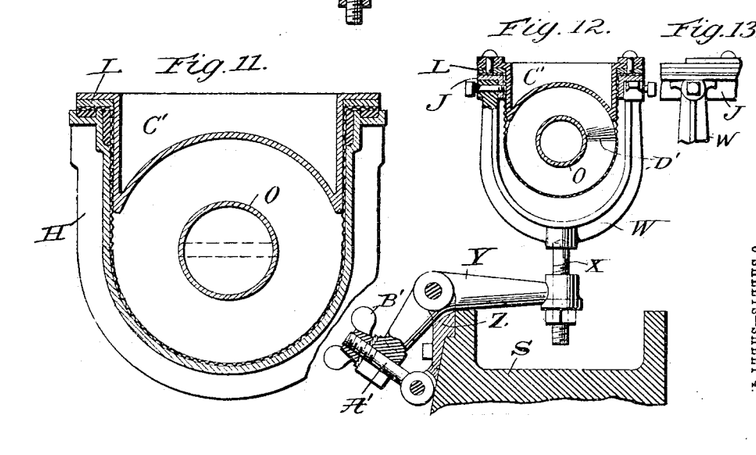
Fig. 11, a similar view taken on the line 11 11 of Fig. 9.
Fig. 12, a like view taken on the line 12 12 of Fig. 1.
Fig. 13, a detail side elevation of a portion of one of the yokes which support the strainer-frame.
Figure 14:
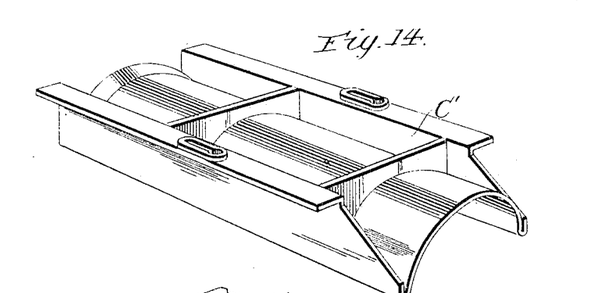
Fig. 14, a perspective view of the cover-plate used at the upper end of the strainer.
Figure 15:
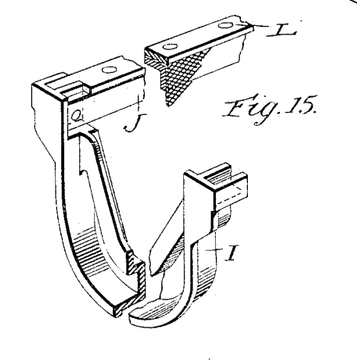
Fig. 15, a perspective view of the frame or member employed at the lower end of the strainer.
Figure 16:
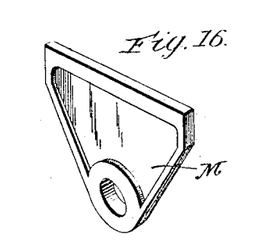
Figure 17:
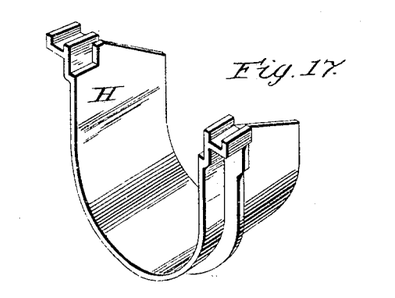
Fig. 17, a perspective view of the frame or casting used at the upper end of the strainer.

The solid cake or mass from which the oil has been expelled passes over the cone E at the discharge end of the press. The oil expressed from the mass descends into a pan or trough F, carried by the framing beneath the body of the press. (See Figs. 1 and 2.) The pan is provided with an opening at one end, from which extends a shelf or incline G, the oil passing therefrom into the strainer located immediately below the same. Said strainer is shown in detail in Figs. 1 and 9 to 17, inclusive. It comprises a U-shaped head-piece or casting H, Fig. 17, and end or tail piece I, Fig. 15, both of these pieces being formed upon their upper faces with sockets or recesses adapted and designed to receive angle plates or bars J, which extend from one casting or member to the other. The body K of the strainer is formed of perforated material, the upper edges of which are secured between the angle-plates J and the overlying bars L, the parts being securely riveted together, as is clearly shown in Fig. 15. The body of the strainer is formed of the head and end or tail pieces, the ends of the foraminous portion being supported in said head and tail pieces. A plate or casting M, Fig. 16, provided with a lateral opening adjacent to its lower end, is seated in the tail-piece, so as to effectively close that portion of the trough. Said plate or the opening formed therein affords a bearing for a stud-axle N, Fig. 9, the inner end of said axle being pin-jointed or otherwise secured to a conveyer-screw O. A similar stud axle or shaft P is secured to the opposite end of the conveyer-screw, and said axles are mounted respectively in bearing-blocks Q, swiveled in the upper ends of vertically-adjustable Y-shaped supports R.

To effect the separation of the foots from the oil and to keep the openings in the strainer clear, it is essential that the foraminous body be held closely to the periphery of the screw, and for this purpose I employ the following mechanism, (best shown in Figs. 1, 9, 12, and 13:) Located directly beneath the strainer is a pan or trough S, which is secured to or forms an integral portion of a block T, fastened to the bed or base U of the press.

Pivotally secured to the under side of each of the angle-bars J is a series of U-shaped brackets or supports W, each bracket having formed in its lower face a socket or recess designed and adapted to receive the upper end of an adjustable pin X, carried at the outer free end of an elbow-lever Y. Each of said levers Y is pivoted to a block or casting Z, secured to the pan S. The lower end of each lever is bifurcated, and a bolt A', which is pivoted to the block Z, passes through said lever. Adjustment of the lever is secured by movement of a winged nut B', mounted upon the bolt A'.

By raising or lowering the supports R of the stud-axles (which in conjunction with the conveyer-flight may be said to form a conveyer-shaft) the inclination of the shaft may be varied as desired. As will be seen upon reference to Fig. 1, the strainer is given an inclination away from the head of the press, so that the oil will flow by gravity to the lower end of the strainer and permit the foots which are fed out through head-piece H to be as free of oil as possible. The strainer or foraminous body is therefore held in proper contact with the screw by adjustment of the winged nuts B', the construction shown in Figs. 12 and 13 permitting the brackets W to adjust themselves with relation to the other parts, and thus evenly hold the foraminous body of the strainer against the conveyer-screws.

The forward or head end of the strainer is preferably provided with a cover C'. (Shown in detail in Figs. 9 and 14.) As will be seen upon reference to Fig. 9, the conveyer is provided with a long screw or flight and with a shorter screw or flight, the latter being designated by the letter D'. The foots which are carried forward by the longer screw that terminates at a point just within the cover C' are pressed forwardly toward the screw D', and by reason of the separation of said screws, as set forth in my patents above noted, the foots are slightly compressed, so that they are discharged from the strainer in a relatively dry state.

Figures 4, 5, 6, 7, 8:
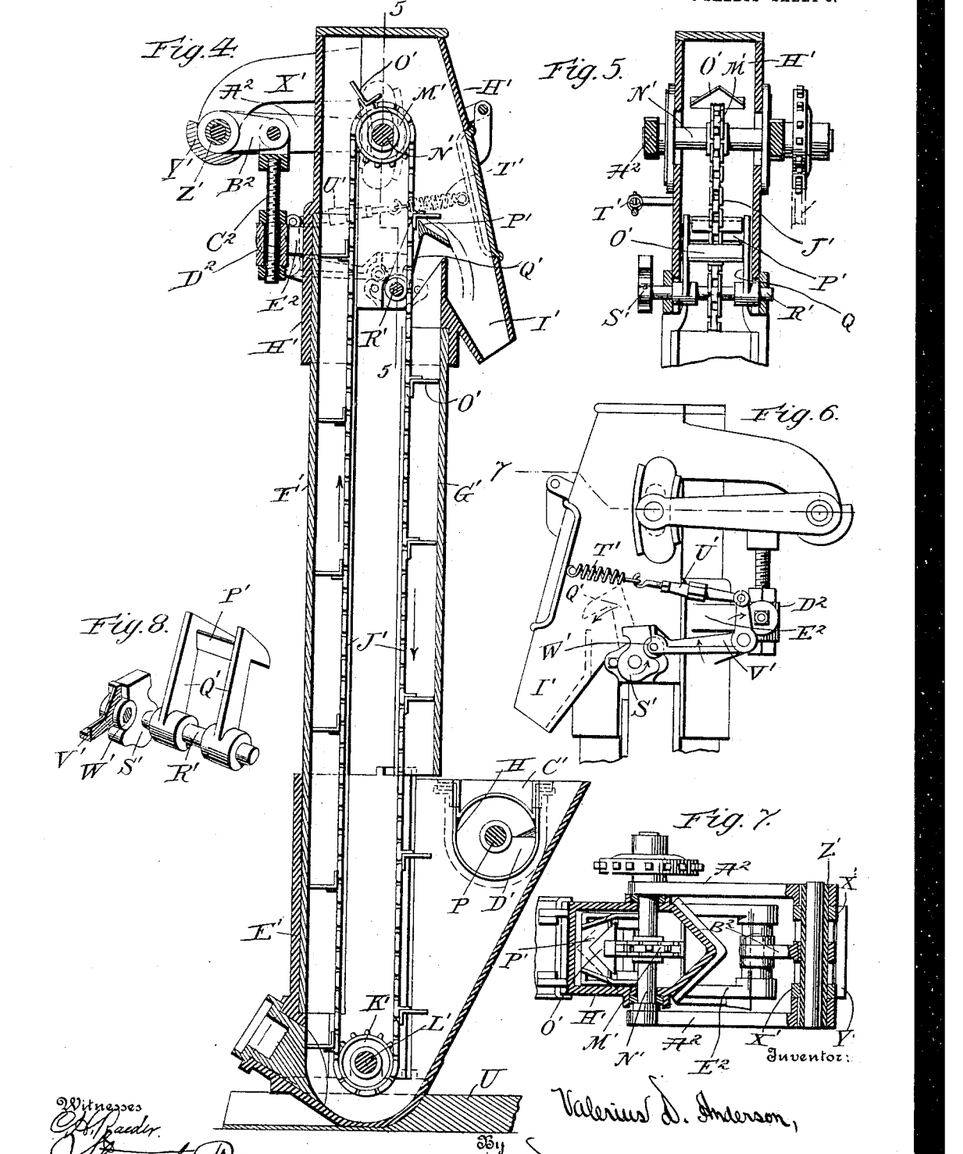
Fig. 4, an enlarged vertical sectional view taken on the line 4 4 of Fig. 1, showing the elevator.
Fig. 5, a vertical sectional view taken on the line 5 5 of Fig. 4.
Fig. 6, a side elevation of the upper portion of the conveyer-housing.
Fig. 7, a horizontal sectional view on the line 7 7 of Fig. 6.
Fig. 8, a perspective view of the scraper employed for removing the material from the elevator-buckets.

It is designed that the foots thus discharged from the strainer shall be carried back into the hopper of the press, and to effect this a conveyer is provided. (Best shown in Figs. 4 to 8, inclusive.) A boot-piece E' is mounted upon the base U, said boot being provided with a lateral offset or portion into which the strainer discharges the foots. (See Fig. 4.) Extending upwardly from the boot are two V-shaped angle plates or bars F' G', said plates being connected to a head-piece H', which is formed with a discharge-spout I', extending in line with the hopper B of the press. (See Fig. 2.)

A sprocket-chain J', passing about a sprocket-wheel K', secured upon a shaft L', mounted within the lower end of the boot and about a similar sprocket-wheel M', carried upon an adjustable shaft N', located in the head-piece H', carries a series of buckets O'. These buckets are preferably triangular in form and fit against the interior faces of the angle plates or bars F' G', the buckets serving to remove the foots from the boot and to carry the same upwardly and discharge them through the spout I' into the hopper B. Inasmuch as the foots tend to adhere to the buckets, a scraper is employed to remove the same and to direct the material thus recovered into the spout I'. This mechanism comprises a cross-bar or scraper P', carried at the outer ends of arms or levers Q', secured upon a shaft R', which is mounted in a suitable bearing in the head-piece. The shaft R' is also provided with a cam-piece S'. The scraper and cam normally stand in the positions respectively shown in full lines in Figs. 4 and 6 and are held in such position by the action of a spring T', which is connected by an adjustable link U' to an elbow-lever V'. The long arm of said lever (as will be seen upon reference to Fig. 6) is provided with a roller W', which bears or rests against the cam. Normally the roller is seated in a depression formed in the cam-block; but as a bucket comes into contact with the upper face of the cross-bar P' of the scraper it forces the scraper downwardly into the position shown in dotted lines in Fig. 6, at which time the roller W' bears upon the elevated portion of the cam S', and the spring T' is placed under tension by the rocking of the elbow-lever V' in the direction indicated by arrows in Fig. 6. As the bucket passes downward the relatively sharp upper edge of the cross-bar P' of the scraper wipes across the entire face of the bucket and withdraws all adhering material therefrom. As the bucket passes off of the scraper the spring T' suddenly throws the scraper back, which tends to force all adhering material from the scraper and into the spout I'. As will be seen upon reference to Fig. 4, the cross-bar P' projects slightly into the spout I', so that the material which is removed from the bucket by the scraper will necessarily be directed into the spout.

The mechanism employed for securing proper tension upon the sprocket-chain J' is best shown in Figs. 1, 4, 5, 6, and 7. Extending upwardly from the head-piece of the conveyer are two arms X', which are connected at their outer depending ends by a trough-shaped member Y'. A sleeve or barrel Z' passes through the arms X' and has secured to its outer ends arms or levers A², in the free ends of which is mounted the shaft N'. A short arm B² is splined or otherwise secured upon the sleeve Z', and a screw C² is pivotally connected to the inner end of said arm, the lower end of the screw passing through a swivel-block D², carried by brackets E², extending outwardly from the head-piece H'. By raising or lowering the screw C' the arms A², and consequently the shaft N', will be elevated or depressed.

Figures 18, 19, 20:
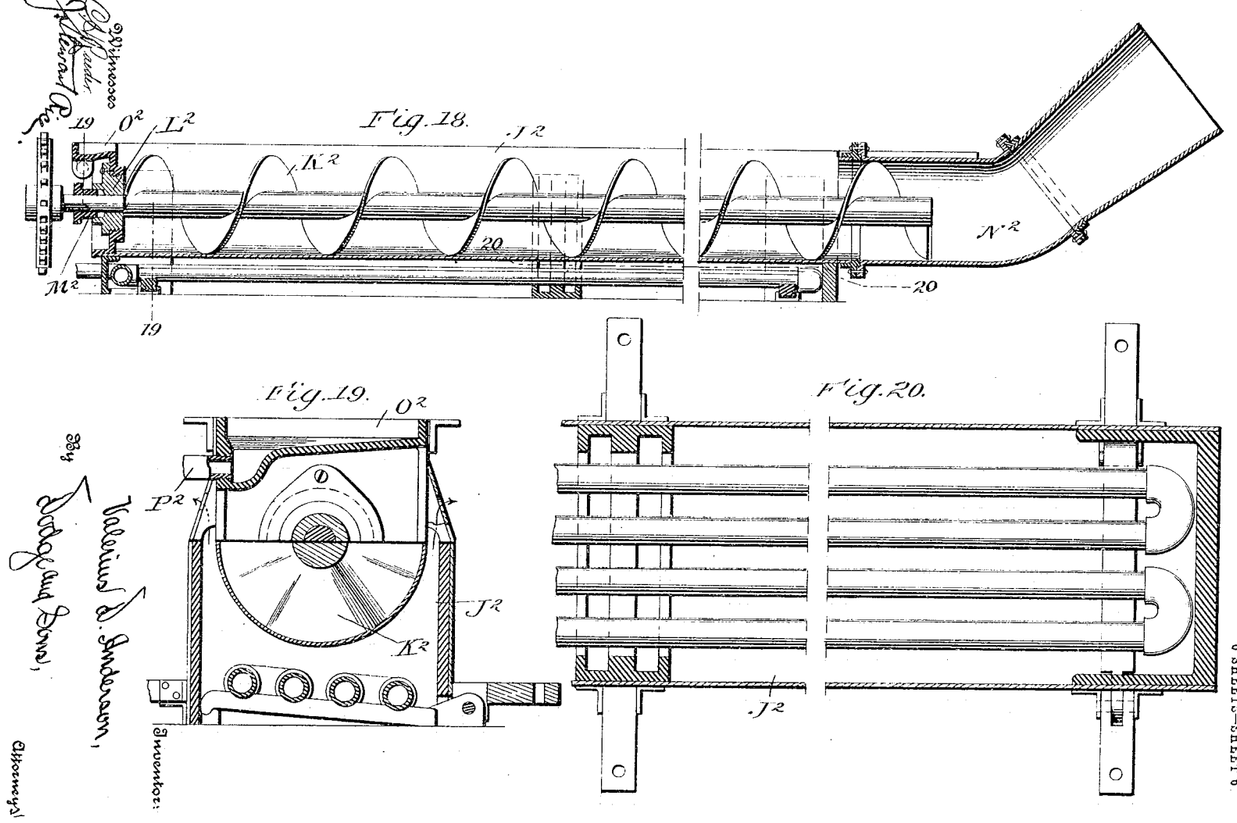

The apparatus so far described has given excellent results; but in order to effect the best possible separation of the oil and the foots a settling-tank may be employed to further treat the oil which flows from the pan S. A pipe F², Fig. 1, passes from the pan S to a pump G², a second pipe H² leading from the pump to a point above the press and discharging at I² into the settling-tank. Said tank comprises a U-shaped trough or receptacle J², in which is mounted an endless worm or screw K². One end of the screw-shaft passes through a head-piece L², provided with a stuffing-box M², which forms a tight joint. At the opposite end of the trough J² is mounted a mouthpiece or nozzle N², which, as shown in Fig. 18, is inclined upward and made somewhat flaring to facilitate the discharge of the foots, which may be separated from the oil and fed to said mouthpiece by the screw. As will be noted upon reference to said figure, the lower end of the mouthpiece is located at a point slightly above the oil-level in the settling-tank, so that the foots will pass from the mouthpiece or nozzle N² into the hopper B (see Fig. 2) in a relatively dry condition.

Beneath the settling trough or receptacle J² is a radiator designed to heat the oil within said trough in order that the foots may be more easily separated from the oil, it having been found that this separation is more readily effected when the oil is heated.

Figure 1:
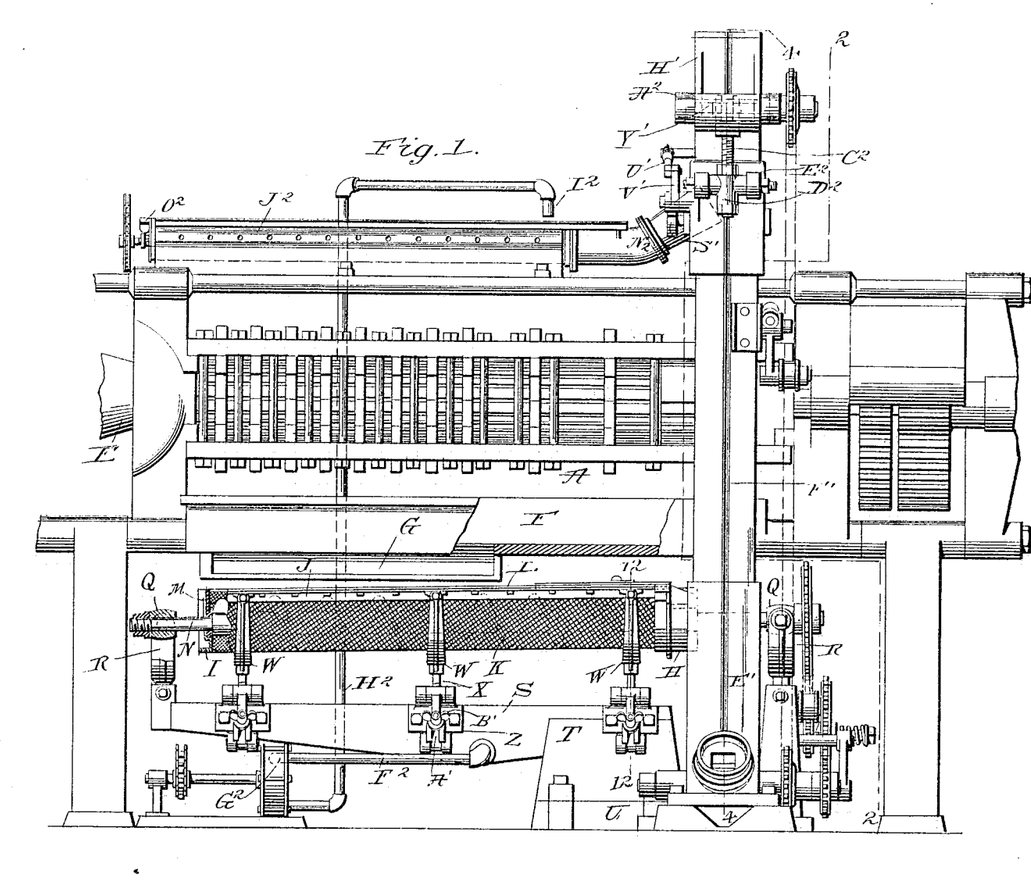
Figure 1 is a side elevation of the press as a whole, portions being broken away to more clearly illustrate certain parts thereof.

As will be seen upon reference to Fig. 1, the oil is fed into the settling-trough at a point adjacent to the mouthpiece or nozzle N², so that it flows from one end of the trough to the opposite end, where it passes into a gutter O² and from thence through a pipe P² to any desired receptacle.

The conveyer-screw is designed to be rotated slowly, so that the oil may not become agitated. The flights of the screw may be said to form a series of dams or partitions between the point where the oil enters and that at which it leaves the trough. This construction, together with the slow movement of the screw, so retards the flow of the oil as to cause the foots to settle when they come into contact with the sides of the flights of the screw or conveyer. As the foots settle to the bottom of the trough they are gradually forced toward the mouthpiece or nozzle N². When they enter said mouthpiece, they continue to accumulate until the nozzle becomes filled with the dry foots, after which they will be discharged continuously into the hopper B.

The press proper may be driven from any suitable source of power. In Figs. 2 and 3 suitable connections are indicated, showing the means for driving the screw operating in the strainer and the elevator. The screw in the settling-tank may be driven from any suitable source.

While I have referred throughout the specification to treating material which will produce oil, it is of course manifest that the apparatus is applicable to the treatment of any material from which it is desired to remove the liquid and to effect a complete separation of the liquid and the finer particles of solid matter.

The apparatus herein shown and described is especially designed for use in conjunction with a continuously-operating press, such as is claimed in the patents hereinbefore mentioned. It is conceivable, however, that the apparatus may be used with a press which is not continuous in its operation, and I have therefore laid claim broadly to the combination with a press of the strainer or means for separating the solid matter from the oil as it passes from the press and returning such matter to the press for further treatment. Claim is also made specifically to a continuously-operating press in combination with such features.

Having thus described my invention, what I claim is—

1. In combination with a press, a strainer to receive the oil therefrom; and means for returning the solid matter withdrawn from the oil to the press.

2. In combination with a press, means for separating the solid matter from the oil passing from the press and returning such solid matter to the press for further treatment.

3. In combination with a press, a strainer to receive the oil therefrom; means working within the strainer to withdraw the solid matter from the same; and means for returning the solid matter to the press for further treatment.

4. In combination with a press, a strainer to receive the oil therefrom; a screw working within the strainer and acting to remove the solid matter from the oil; and a conveyer for returning the solid matter thus removed to the press for further treatment.

5. In combination with a press, a strainer to receive the oil therefrom; a screw working in the strainer; and means for maintaining the strainer in close contact with said screw.

6. In combination with a press, a strainer to receive the oil therefrom; a screw working in the strainer; means for maintaining the strainer in close contact with said screw; and means for returning the solid matter withdrawn from the strainer by the screw to the press for further treatment.

7. In combination with a press, a strainer to receive the oil therefrom; a screw working in the strainer, said screw having an independent section or flight adjacent to the discharge end of the strainer; a cover fitting over said section or flight; and means for maintaining the strainer in close contact with the screw.

8. In combination with a press, a strainer to receive the oil therefrom; means contained within the strainer for removing the solid matter therefrom in a relatively dry state; and means for returning said matter to the press for further treatment.

9. In combination with a press, a strainer mounted below the same, said strainer being inclined away from the head of the press; means contained within the strainer for removing the solid matter therefrom and discharging the same from the elevated end of the strainer; and means for returning said matter to the press for further treatment.

10. In combination with a press, a pan below the same; a strainer located beneath the pan and receiving the oil therefrom; means contained within the strainer for withdrawing the solid matter therefrom; and means for returning the solid matter to the press for further treatment.

11. In combination with a press, a pan below the same, said pan being provided with a discharge-opening at or near one end thereof; a strainer located beneath the pan and inclining upwardly away from the opening; means for withdrawing the solid matter from the upper end of the strainer; and means for returning said matter to the press.

12. In combination with a press, a pan below the same; a strainer receiving the oil from the pan; means for withdrawing the solid matter from the strainer and returning the same to the press; a trough located beneath the strainer; and means for holding the strainer in close contact with the means working therein which removes the solid matter.

13. In combination with a press; a strainer to receive the oil therefrom; a screw working in the strainer; a pan below the strainer; and means interposed between the pan and the strainer for maintaining the strainer in close contact with the screw.

14. In combination with a press, a strainer located beneath the same; a screw working in the strainer; a pan beneath the strainer; a series of U-shaped supports for the strainer; and means for securing adjustment of said supports.

15. In combination with a press; a strainer comprising a substantially U-shaped foraminous body, members secured to the upper edges of said body, a head-piece at the upper end of the foraminous body, and a tailpiece at the opposite end; a series of U-shaped supports pivotally connected to the members secured to the body of the strainer; and means for adjusting said supports.

16. In combination with a press, a strainer comprising a substantially U-shaped body; a series of adjustable supports therefor; a screw conveyer working in said strainer; and adjustable bearings for the opposite ends of said conveyer, whereby the inclination of the U-shaped body and screw may be varied as desired and the strainer held in close contact with the screw, substantially as described.

17. In combination with a press, a strainer comprising a substantially U-shaped foraminous body, a head-casting, a tail-casting, an angle-plate and a bar secured to each upper edge of the foraminous body, said plates and bars being seated at their ends in the head and tail castings; a series of U-shaped supports pivotally connected to said angle-plates; a series of adjustable elbow-levers pivoted below said supports; an adjustable pin mounted in one end of each of said levers and bearing against the under face of the U-shaped supports; and a screw working in the strainer.

18. In combination with a press, a strainer; means for removing the solid matter therefrom and returning the same to the press; means for effecting a further separation of the solid matter from the oil which passes from the strainer; and means for returning to the press the solid matter thus recovered.

19. In combination with a press, a primary mechanism for receiving the oil directly therefrom, effecting a substantial separation of the foots from the oil and returning such foots to the press; and a secondary mechanism receiving the oil from the primary mechanism, said secondary mechanism effecting a final separation and returning the foots to the press.

20. In combination with a press, means for effecting a substantially complete separation of the foots from the oil after the oil has passed from the press; and means for returning the foots to the press.

21. In combination with a press, a strainer; means for removing the solid matter therefrom and returning it to the press; a settling-tank receiving the oil from the strainer; and means for withdrawing the solid matter from the tank.

22. In combination with a press, a strainer; means for removing the solid matter therefrom and returning it to the press; a settling-tank receiving the oil from the strainer; and means for removing the solid matter from the tank and returning it to the press.

23. In combination with a press, a strainer; means for removing the solid matter therefrom and returning it to the press; a settling-tank receiving the oil from the strainer; means for heating said tank; and means for withdrawing the solid matter from the tank and returning it to the press.

24. In combination with a press, a strainer; means for removing the solid matter therefrom and returning it to the press; a settling-tank receiving the oil from the strainer; means for heating said tank; and a screw mounted in the tank, said screw serving to withdraw the solid matter from the tank.

25. In combination with a press, a strainer; means for removing the solid matter therefrom; a settling-tank receiving the oil from said strainer, said tank being provided at one end with an oil-outlet and at its opposite end with an elevated mouthpiece; and a screw mounted in said tank and serving to feed the solid matter toward the elevated mouthpiece.

26. In combination with a press, a strainer; means for removing the solid matter therefrom; a settling-tank receiving the oil from said strainer, said tank being provided at one end with an oil-outlet and at its opposite end with an elevated mouthpiece; a screw mounted in said tank and serving to feed the solid matter toward the mouthpiece; and means for heating the tank.

27. In combination with a press having a feed-hopper; means for effecting a separation of the foots from the oil which passes from the press; an endless conveyer serving to return the foots thus separated to the hopper; and means for removing the material from the conveyer.

28. In combination with a press having a feed-hopper; means for effecting a separation of the foots from the oil which passes from the press; an endless-bucket conveyer serving to return the foots thus separated to the hopper; and means for withdrawing any adhering matter from the buckets and causing its discharge into the hopper.

29. In combination with a press having a feed-hopper; means for effecting a separation of the foots from the oil which passes from the press; an endless-bucket conveyer receiving the foots thus recovered, said conveyer having a spout which discharges into the hopper; and means working in line with said spout to clear the buckets and throw the matter thus removed into the spout.

30. In combination with a press having a feed-hopper; means for effecting a separation of the foots from the oil which passes from the press; an endless-bucket conveyer receiving the foots thus recovered, said conveyer having a spout which discharges into the hopper; a pivoted scraper standing in line with the spout and with the buckets; and spring-actuated mechanism for throwing the scraper rearwardly as it passes out of contact with each of the buckets, whereby adhering matter will be removed from the buckets and directed into the spout.

31. In combination with a continuously-operating press, a strainer to receive the oil therefrom; and means for returning the solid matter withdrawn from the oil to the press.

32. In combination with a continuously-operating press, means for separating the solid matter from the oil passing from the press and returning such solid matter to the press for further treatment.

33. In combination with a continuously-operating press, a strainer to receive the oil therefrom; means working within the strainer to withdraw the solid matter from the same; and means for returning the solid matter to the press for further treatment.

34. In combination with a continuously-operating press, a strainer to receive the oil therefrom; a screw working within the strainer and acting to remove the solid matter from the oil; and a conveyer for returning the solid matter thus removed to the press for further treatment.

35. In combination with a continuously-operating press, a strainer to receive the oil therefrom; a screw working in the strainer; and means for maintaining the strainer in close contact with said screw.

36. In combination with a continuously-operating press, a strainer to receive the oil therefrom; a screw working in the strainer; means for maintaining the strainer in close contact with said screw; and means for returning the solid matter withdrawn from the strainer by the screw to the press for further treatment.

37. In combination with a continuously-operating press, a strainer to receive the oil therefrom; a screw working in the strainer, said screw having an independent section or flight adjacent to the discharge end of the strainer; a cover fitting over said section or flight; and means for maintaining the strainer in close contact with the screw.

38. In combination with a continuously-operating press, a strainer to receive the oil therefrom; means contained within the strainer for removing the solid matter therefrom in a relatively dry state; and means for returning said matter to the press for further treatment.

39. In combination with a continuously-operating press, a strainer mounted below the same, said strainer being inclined away from the head of the press; means contained within the strainer for removing the solid matter therefrom and discharging the same from the elevated end of the strainer; and means for returning said matter to the press for further treatment.

40. In combination with a continuously-operating press, a pan below the same; a strainer located beneath the pan and receiving the oil therefrom; means contained within the strainer for withdrawing the solid matter therefrom; and means for returning the solid matter to the press for further treatment.

41. In combination with a continuously-operating press having a feed-hopper; means for effecting a separation of the foots from the oil which passes from the press; an endless conveyer serving to return the foots thus separated to the hopper; and means for removing the material from the conveyer.

In testimony whereof I have signed my name to this specification in the presence of two subscribing witnesses.

VALERIUS D. ANDERSON.

Witnesses:
  C. W. TOLAND,
  F. B. ANDERSON.